(12) United States Patent
Lubanski

(10) Patent No.: US 7,943,851 B2
(45) Date of Patent: May 17, 2011

(54) CABLE PROTECTION SYSTEM WITH PHOTOLUMINESCENT INDICIA AND RELATED METHODS

(75) Inventor: Thomas M. Lubanski, Claremont, CA (US)

(73) Assignee: Peterson Systems International, Inc., Duarte, CA (US)

(*) Notice: Subject to any disclaimer, the term of this patent is extended or adjusted under 35 U.S.C. 154(b) by 210 days.

(21) Appl. No.: 12/398,062

(22) Filed: Mar. 4, 2009

(65) Prior Publication Data

US 2010/0224388 A1    Sep. 9, 2010

(51) Int. Cl.
*H02G 3/04* (2006.01)

(52) U.S. Cl. ........ 174/97; 174/68.1; 174/101; 248/74.2; 138/155

(58) Field of Classification Search .......... 174/101, 174/68.191, 95–98, 70 C, 481, 484, 482, 174/135, 68.1; 248/74.2, 74.1, 68.1; 439/120, 439/209, 212, 216; 403/387; 138/155, 157, 105, 110; 104/275

See application file for complete search history.

(56) References Cited

U.S. PATENT DOCUMENTS

| | | | | |
|---|---|---|---|---|
| 4,424,627 A * | 1/1984 | Tarbox | ............................ | 29/857 |
| 5,095,822 A * | 3/1992 | Martin | .......................... | 104/275 |
| 5,779,919 A * | 7/1998 | DiPietro et al. | .................. | 216/4 |
| 6,499,410 B1 * | 12/2002 | Berardi | ......................... | 104/275 |
| 7,145,079 B1 * | 12/2006 | Henry | ........................... | 174/101 |
| 7,385,139 B2 * | 6/2008 | Lubanski | ........................ | 174/97 |

* cited by examiner

*Primary Examiner* — Dhiru R Patel
(74) *Attorney, Agent, or Firm* — Holland & Hart

(57) ABSTRACT

A cable protector may include a base member, at least one channel extending between opposing ends of the base member and structured to house at least one cable, and at least one indicia member positioned on the cable protector so as to be visible. The indicia member includes a photoluminescent portion. The cable protector may also include at least one side ramp removably attached to the base member, wherein at least one photoluminescent indicia member is positioned on the at least one side ramp. The photoluminescent portion of the indicia member may define a symbol, text, or strip.

22 Claims, 10 Drawing Sheets

CABLE PROTECTION SYSTEM WITH PHOTOLUMINESCENT INDICIA AND RELATED METHODS

BACKGROUND

Over the years, various devices and apparatuses have been developed in an effort to protect hoses, cables, wiring, and the like from physical damage. In particular, numerous cable protector designs have been developed to protect cabling extending across walkways, roadways, and construction sites from physical damage caused by pedestrians, vehicular traffic, and other such external elements. Cable protectors have also proven useful in helping to minimize the risk of pedestrians tripping over such cabling.

Conventional cable protectors typically include one or more channels extending in parallel between opposing ends of the cable protector to receive one or more cables. Side ramps may extend laterally outward from, or may be removably attachable to, the sides of the cable protector to allow vehicles and the like to roll over the top of the cable protector. In some cases, these side ramps are configured to have a relatively gradual slope so that a wheelchair, walker, or the like may pass over the cable protector with minimal effort.

SUMMARY

As will be described in greater detail below, the present disclosure generally relates to cable protectors and cable protection systems having indicia that have photoluminescent portions. One aspect of the present disclosure relates to a cable protector that includes a base member, at least one channel extending between opposing ends of the base member and structured to house at least one cable, and an indicia member positioned on or within the base member, wherein the indicia member includes photoluminescent material. The indicia member may include safety related indicia such as text and symbols.

The cable protector may also include a cover structure pivotally attached to the base member, and the indicia member is positioned on the cover structure. The indicia member may be included in a label and the label is secured to the base member. The indicia member may be embedded in the base member. The indicia member may be applied to the base member as a liquid and cured into a solid state while on the base member. The cable protector may include at least one side ramp, and the indicia member is positioned on the side ramp. The side ramp may be removably attached to the base member. The side ramp may be integrally formed with the base member. The cable protector may also include first and second side ramps, wherein a separate indicia member is positioned on each of the first and second side ramps. The base member may include a recess defined in a top surface of the base member, and the indicia member is positioned in the recess. The indicia member may include a symbol selected from a group consisting of a power symbol, a tripping hazard symbol, and a handicap symbol. The indicia member may also include at least one elongate strip of photoluminescent material.

A further aspect of the present disclosure relates to a side ramp structured to be removably attachable to, or integrally formed with, a side of a cable protector. In one embodiment, this side ramp may include a first side, a second side, a first end, a second end, and a indicia member positioned within or on the side member so as to be visible. The indicia member may include a photoluminescent portion. The side ramp may also comprise a slot or a recess for housing the indicia member. The side ramp may also comprise an indicia-covering structure for retaining the indicia member within the recess of the side ramp.

The indicia member of the side ramp may include a symbol or a strip of photoluminescent material. The indicia member may be embedded in the side ramp. The indicia member may be applied to a surface of the side ramp in the form of a label or in the form of a liquid that cures into a solid on the surface.

Another aspect of the present disclosure relates to a cable protection system. In certain embodiments, this cable protection system may include at least one cable protector, at least one channel extending between opposing ends of the cable protector and structured to receive at least one cable, at least one side ramp removably attached to the cable protector, and a indicia member positioned within or on at least one of the cable protector and the side ramp so as to be visible. The indicia member may include a photoluminescent portion.

In one example, at least one photoluminescent indicia member of the cable protection system is positioned on each of the at least one cable protector and the at least one side ramp. The at least one photoluminescent indicia member may be embedded in the at least one of the cable protector and the side ramp. The cable protector may include a cover structure pivotally attached to the cable protector, wherein the photoluminescent indicia member being positioned on the cover structure. The photoluminescent indicia member may include at least one of a symbol comprising photoluminescent material and a strip comprising photoluminescent material.

Features from any of the above-mentioned embodiments may be used in combination with one another in accordance with the general principles described herein. These and other embodiments, features and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
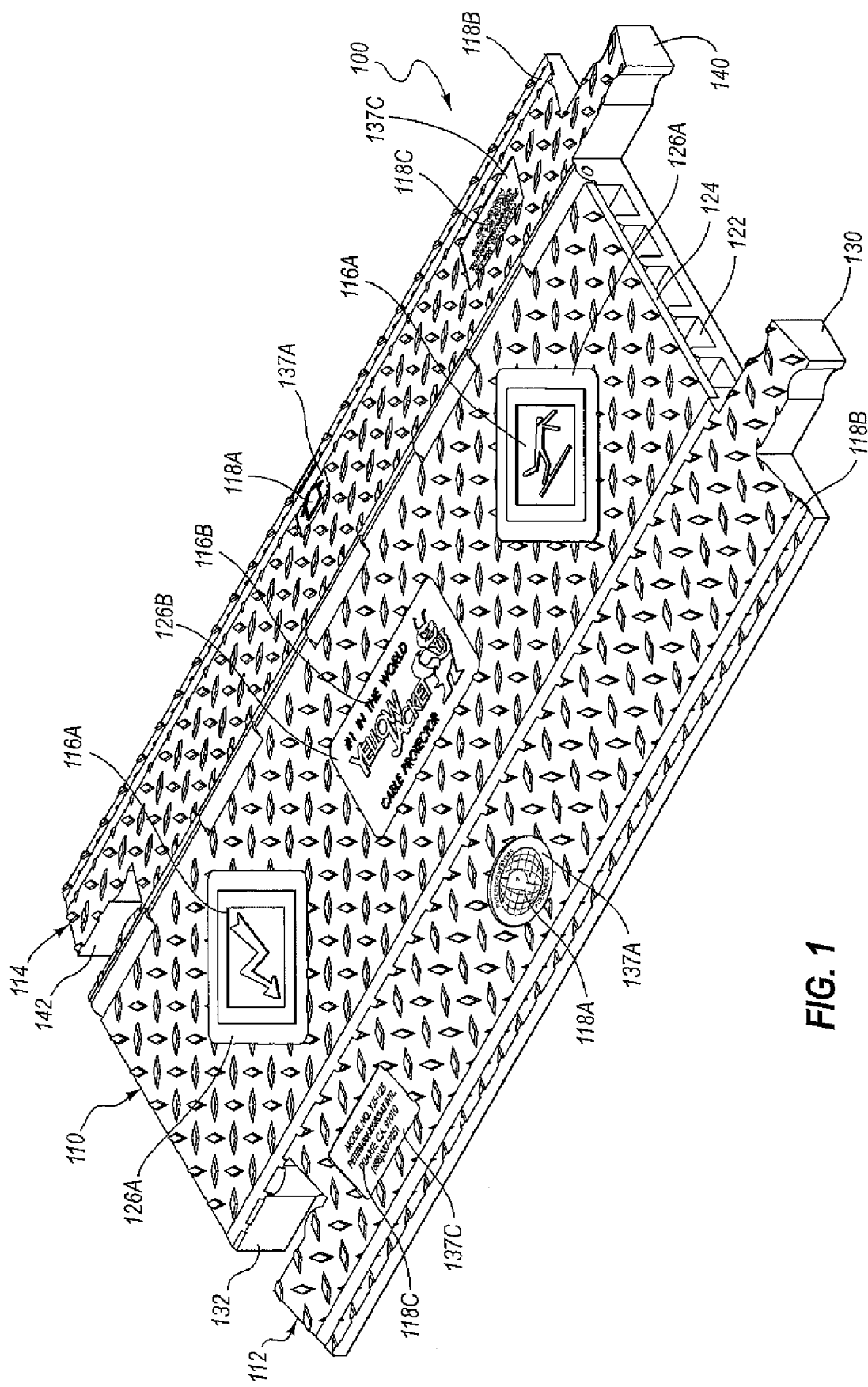
FIG. 1 is a perspective view of an exemplary cable protection system according to at least one embodiment.
Figure 2:
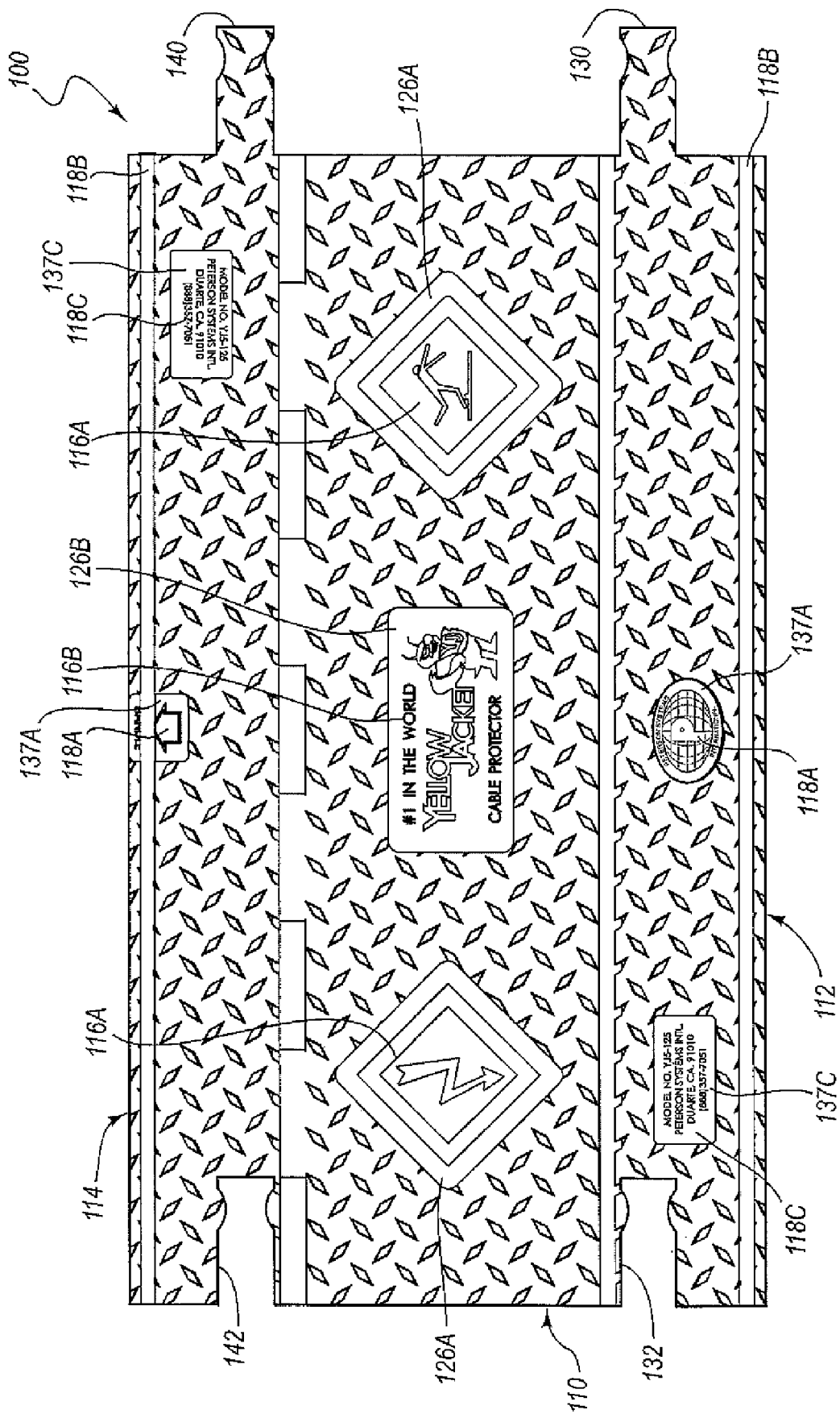
FIG. 2 is a top view of the exemplary cable protection system illustrated in FIG. 1.
Figure 3:
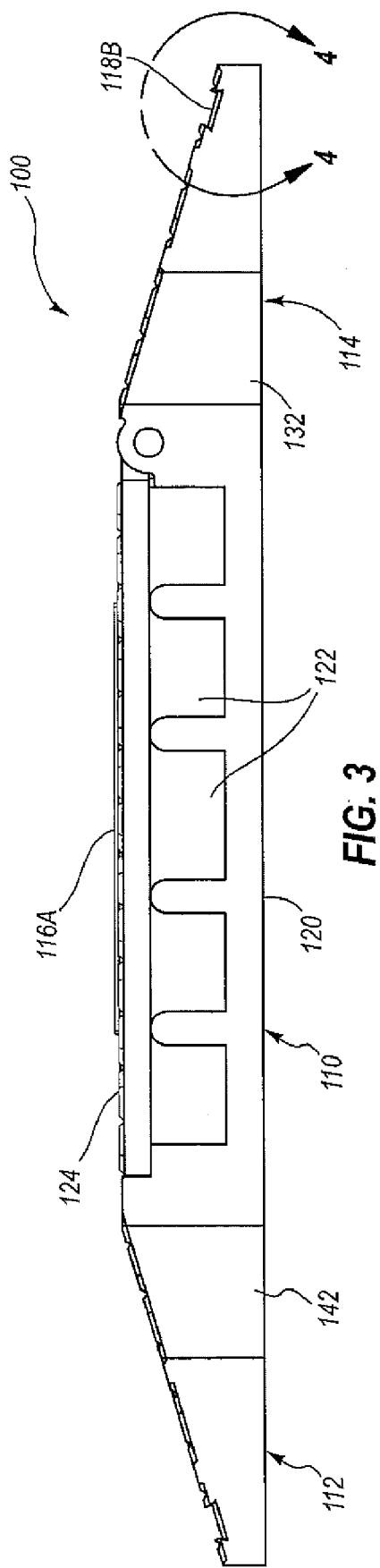
FIG. 3 is an end view of an exemplary cable protection system illustrated in FIG. 1.
Figure 4:
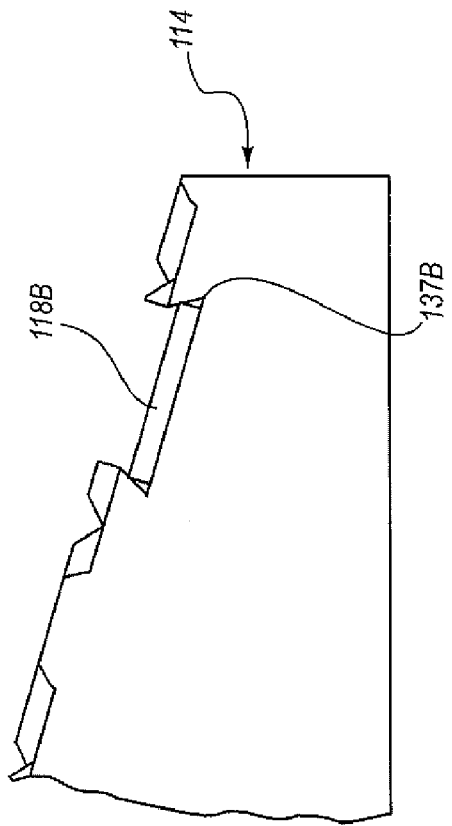
FIG. 4 is a partial close up view of the cable protection system illustrated in FIG. 3.
Figure 5:
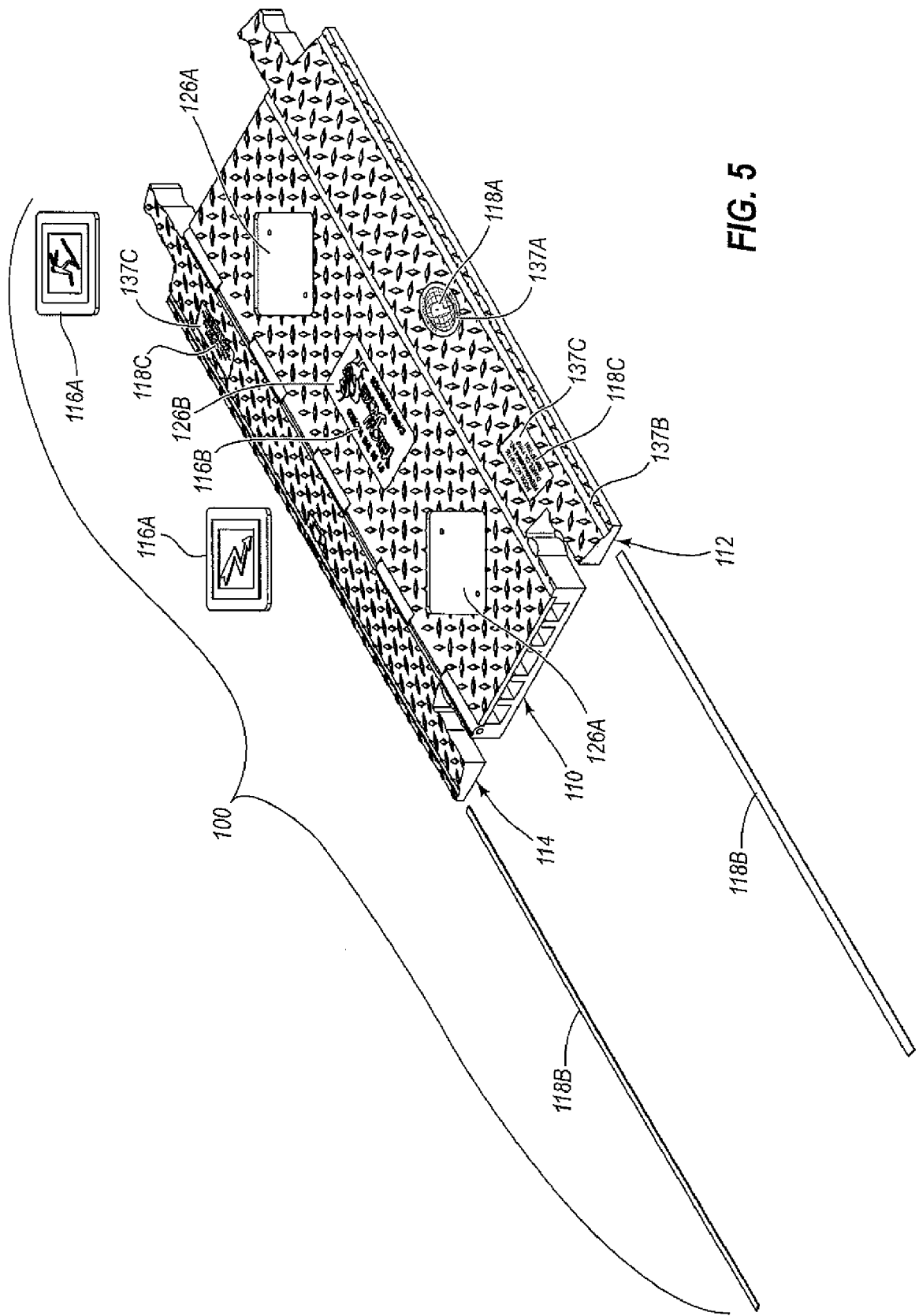
FIG. 5 is an exploded perspective view of the exemplary cable protection system illustrated in FIG. 1.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, one of skill in the art will understand that the exemplary embodiments described herein are not intended to be limited to the particular forms disclosed. Rather, the instant disclosure covers all modifications, equivalents, and alternatives falling within the scope defined by the appended claims.

DETAILED DESCRIPTION OF EXEMPLARY EMBODIMENTS

As will be described in greater detail below, the instant disclosure generally relates to cable protectors and cable protection systems having photoluminescent indicia members or photoluminescent portions. FIGS. 1-5 illustrate an example cable protection system 100 according to at least one embodiment. As illustrated in these figures, an exemplary cable protection system 100 may include a cable protector 110, a first side ramp 112, and a second side ramp 114.

In certain embodiments, cable protector 110 includes a base member 120. Base member 120 may be substantially rectangular, as illustrated in FIGS. 1-5, or formed in any number of other shapes or sizes, such as a square or other multi-sided shape. In certain embodiments, base member 120 may include one or more channels 122 for housing one or more cables. Numerous forms of cables and wires may be housed within base member 120, including, for example, data cables, hoses, electrical wiring, telephone cables, conduits, optical fibers, pneumatic tubing, plumbing, and any other length of material. In the exemplary embodiments illustrated in FIGS. 1-5, a cover structure 124 may be pivotally attached to base member 120. When in a closed position, cover structure 124 may cover channels 122 to protect any cables housed therein.

In certain embodiments, base member 120 may be integrally formed with first side ramp 112 and second side ramp 114. In additional embodiments, such as the embodiment shown with reference to FIGS. 1-5, base member 120 may be removably attached to first side ramp 112 and second side ramp 114.

In at least one embodiment, first side ramp 112 may include one or more male end connectors 130 formed on one of its ends and one or more female end connectors 132 formed on its opposing end. Additionally or alternatively, one or more male end connectors 130 and one or more female end connectors 132 may be provided on the same end of first side ramp 112. Although illustrated in FIGS. 1-5 as being formed in a general hourglass shape, end connectors 130 and 132 may be formed in any shape, including, for example, complimentary block-shaped connectors, so-called tongue-and-groove connectors, so-called dogbone-shaped connectors, T-shaped connectors, and the like.

Similar to first side ramp 112, second side ramp 114 may include one or more male end connectors 140 and one or more female end connectors 142 formed on its ends. Generally speaking, end connectors 140 and 142 may be formed of any shape or connecting structure, including, for example, hourglass-shaped connectors, complimentary block-shaped connectors, so-called dogbone-shaped connectors, so-called tongue-and-groove connectors, T-shaped connectors, and the like.

As illustrated in FIG. 1-5, in certain embodiments one or more photoluminescent indicia members 116A-B may be housed or disposed within or on at least a portion of cable protector 110. Indicia members 116A-B generally represent any type or form or structure having indicia thereon. Any type or form of indicia may be provided on indicia members 116A-B. Indicia member 116A generally represents indicia in the form of a symbol. Indicia member 116B generally represents indicia in the form of text. In certain embodiments, indicia members 116A, B may represent an advertising sheet or plate having indicia thereon.

Other examples of indicia that may be provided in place of or in conjunction with indicia members 116A-B include, without limitation, indicia that indicates at least a product name of the cable protection system 100, indicia that indicates a manufacturer of cable protection system 100, safety related indicia such as warning text and symbols, and directional indicia.

Some example safety related indicia include a symbol representing power/electricity, a symbol representing a step structure or tripping hazard, and a symbol representing handicap accessibility. Some example directional indicia include shapes such as arrows, strips arranged in a longitudinal, lateral or angled directions, and strips having variable sizes, widths, lengths and relative positioning. The safety indicia can include any shape, symbol or color set forth in the American National Standards Institute (ANSI), which ANSI shapes and criteria are incorporated in their entirety by reference.

Indicia members 116A-B may be formed in any shape or size and of any material or combination of materials. For example, indicia member 116 may be formed of paper, wood, or metal, or molded of a rigid, high-strength plastic material capable of withstanding repeated loadings and stresses. In certain embodiments, indicia members 116A-B may include a photoluminescent material. Some example photoluminescent materials can be provided in the form of sheets, strips, pellets, powders, aerosol sprays, liquids and other states.

Photoluminescence is initiated by directing light into a material where the light is absorbed and imparts excess energy into the material in a process called photo-excitation. One way this excess energy can be dissipated by the sample is through the emission of light, or luminescence. In the case of photo-excitation, this luminescence is called photoluminescence. The intensity and spectral content of this photoluminescence can be influenced by certain properties of the material. Photo-excitation causes electrons within the material to move into permissible excited states. When these electrons return to their equilibrium states, the excess energy is released and may include the emission of light (a radiative process) or may not (a nonradiative process). The energy of the emitted light (photoluminescence) relates to the difference in energy levels between the two electron states involved in the transition between the excited state and the equilibrium state. The quantity of the emitted light is related to the relative contribution of the radiative process. Materials having strong photoluminescent properties typically provide high intensity emission of light for an extended period of time.

The photoluminescent material used with indicia members 116A-B may be provided in various forms or states. For example, the photoluminescent material may be applied to one or more surfaces of the cable protector 110 in a liquid state using spraying techniques such as vapor deposition or silk screening. Alternatively, the photoluminescent material may be fixed in a label structure that is temporarily or permanently mounted to a surface of the cable protector 110. In another example, photoluminescent material is co-molded with, included as an additive, inserted into (e.g., see FIGS. 10-11), or in some form embedded in a portion of the cable protector 110. In one example, the photoluminescent material is included as an additive in a urethane material that is molded to form components of the cable protector 110. In another example, photoluminescent material may be co-molded with, inserted into, or in some form embedded in the cover structure 118. In another example, the cable protector is a dropover style cable protect that includes an integral top surface as opposed to a movable lid, and the photoluminescent material is co-molded with, inserted into, or in some form embedded in the dropover style cable protector.

Indicia members 116A-B may be disposed on or housed within at least a portion of cable protector 110 in a variety of ways. For example, as illustrated in FIGS. 1-5, indicia member 116 may be positioned or housed within one of the recess or slot features 126A-B defined in cover structure 124. The recesses 126A-B may be formed in any shape or size. In this example, indicia members 116A-B may be positioned within cover structure 124 by vertically dropping indicia members 116A-B into recesses 126A-B. In other examples, the recesses 126A-B may be accessible from an alternative location such as, for example, from a lateral opening or from an access point along a bottom side of the cover structure 124.

The surface to which the photoluminescent material is applied may be recessed relative to adjacent surfaces of the cable protector 110. Further, the surface to which the photoluminescent material is applied may be relatively smooth or planar as compared to other surfaces of the cable protector 110 that may be, for example, textured for purposes of providing additional traction.

As with cable protector 110, in certain embodiments first side ramp 112 and second side ramp 114 may include indicia members 118A-C having photoluminescent material or photoluminescent properties. For example, at least one indicia member 118A-C may be positioned on or housed within first side ramp 112, as illustrated in FIGS. 1-5. Similarly, at least one indicia member 118A-C may be positioned on or housed within at least a portion of second side ramp 114, as illustrated in FIGS. 1-5. Indicia member 118A generally represents indicia in the form of a symbol. Indicia member 118B generally represents indicia in the form of a shape such as an elongated strip. Indicia member 118C generally represents indicia in the form of text.

The indicia members 118A-C can be positioned or housed within one of the recess or slot features 137A-C defined in the side ramps 112, 114. The recesses 137A-C may be formed in any shape or size. In this example, indicia members 118A and 118C may be positioned within side ramps 112, 114 by vertically dropping indicia members 118A and 118C into recesses 137A and 137C. The indicia member 118B may be positioned within the recess 137B by inserting the indicia member 118B through an open end of the recess 137B. The shape, size, material composition, mounting variations, and other aspects of the indicia members 118A-C and recesses 137A-C can be similar to those aspects of indicia members 116A-B and recesses 126A-B discussed above.

In certain embodiments, all or at least a portion of cable protector 110, first side ramp 112, and/or second side ramp 114 may be formed of a substantially or at least partially transparent material. A cable protector having a transparent or translucent portion is described in U.S. application Ser. No. 12/177,714, titled "Substantially Transparent Cable Protector and Cable Protection System," and filed on 22 Jul. 2008, which application is incorporated herein by reference in its entirety. Any of the photoluminescent aspects of an indicia member disclosed herein may be implemented into the indicia members disclosed in U.S. application Ser. No. 12/177, 714.

In embodiments including a transparent or translucent portion of the cable protection system 100, the indicia on indicia members 116A-B, 118A-C positioned on or housed within cable protector 110, first side ramp 112, and second side ramp 114 may be seen through the substantially transparent or translucent portion of cable protector 110, first side ramp 112, and second side ramp 114.

The exemplary cable protection system 100 illustrated in FIGS. 1-5 may provide a number of advantages. For example, the photoluminescent properties of cable protection system 100 are operational without the need for an alternative power source that requires cables, wires, or batteries that must be maintained, turned on or off, or disposed of (in the case of batteries). The photoluminescent properties of cable protection system 100 are generated by absorbing natural or artificial light, sometimes within a relative short time period of less than an hour, and then can operate for many hours. The photoluminescent properties of cable protection system 100 may be essentially maintenance free, have an extended useful life, and can operate with little hazard to users because no electricity is required for operation. Further, the photoluminescent properties of cable protection system 100 may be tailored for a given size, shape and use of the cable protection system without limitation to the size and shape of the indicia members that include the photoluminescent materials.

Figure 6:
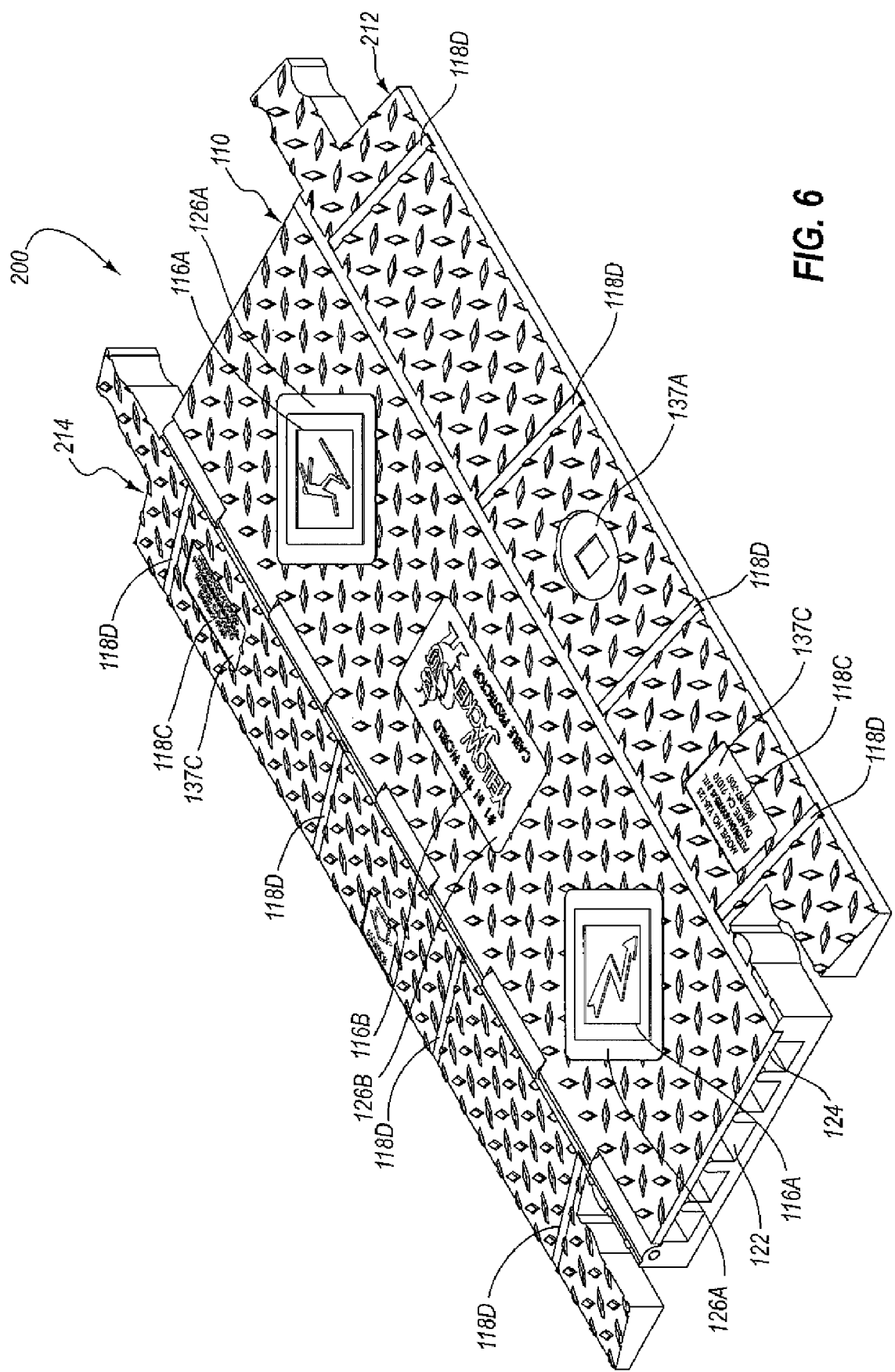
FIG. 6 is a perspective view of another exemplary cable protection system according to an additional embodiment.
Figure 7:
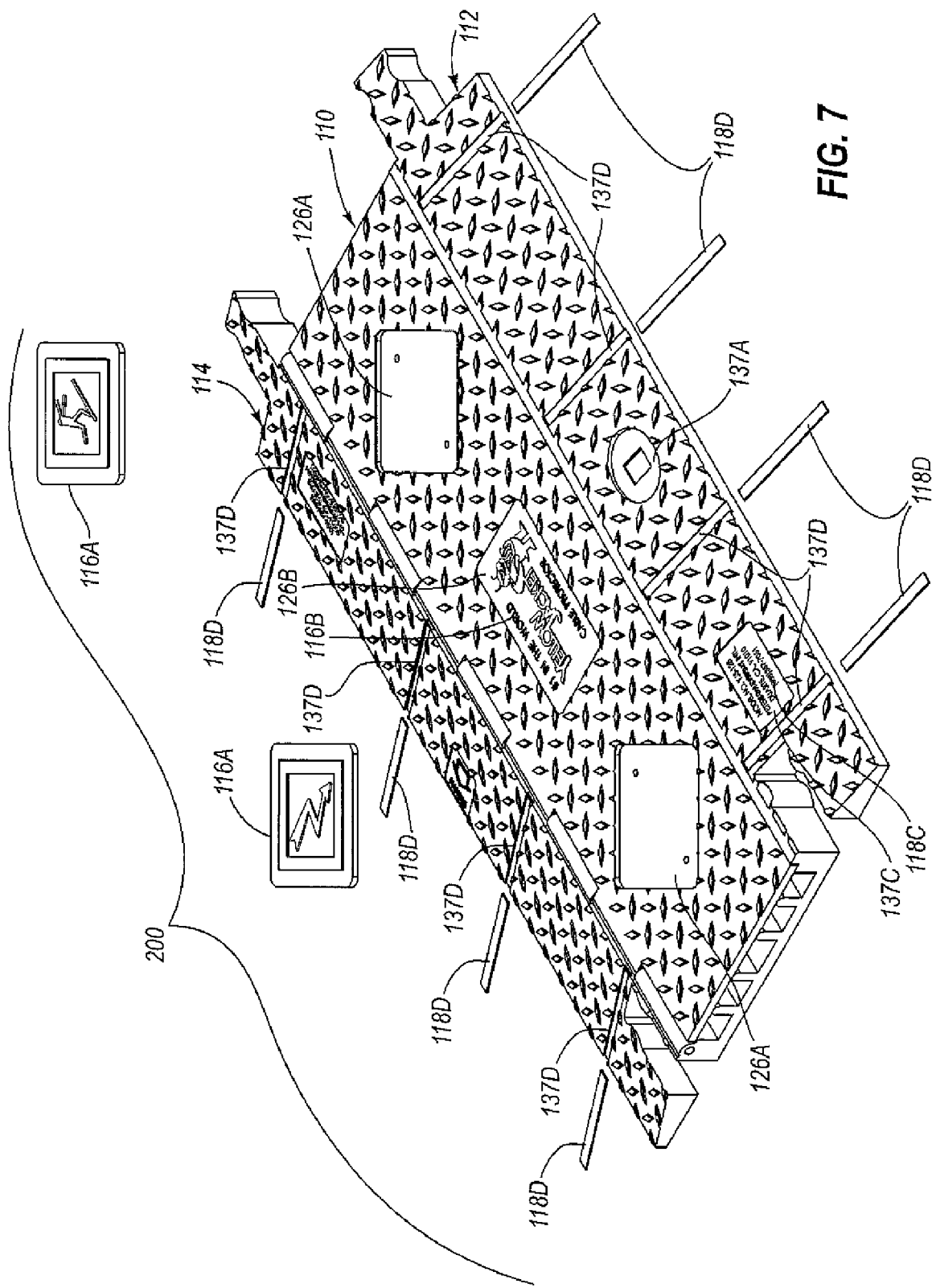
FIG. 7 is an exploded perspective view of the cable protection system illustrated in FIG. 6.

FIGS. 6-7 are perspective views of another exemplary cable protection system 200 comprising a cable protector 210, a first side ramp 212, and a second side ramp 214. The cable protector 110 with indicia members 216A-B may be substantially the same as described above related to FIGS. 1-5. The first and second side ramps 212, 214 may be substantially similar to the side ramps 112, 114 described above. The side ramps 212, 214 include indicia members 118C-D. The indicia members 118C-D may include photoluminescent material.

The indicia member 118A from FIGS. 1-5 is removed from recess 137A in FIGS. 6-7, but could be included in other embodiments. The indicia members 118D extend in a generally transverse direction relative to a length dimension (i.e., parallel with the cable channels 122 of the cable protection system 200. The indicia members 118D can be included in place of or in addition to the indicia members 118B. The indicia members 118D may be mounted to the side ramps 212, 214 in a similar way to mounting of the indicia members 118B described above. Other arrangements for the indicia members 118C-D are possible.

Figure 8:
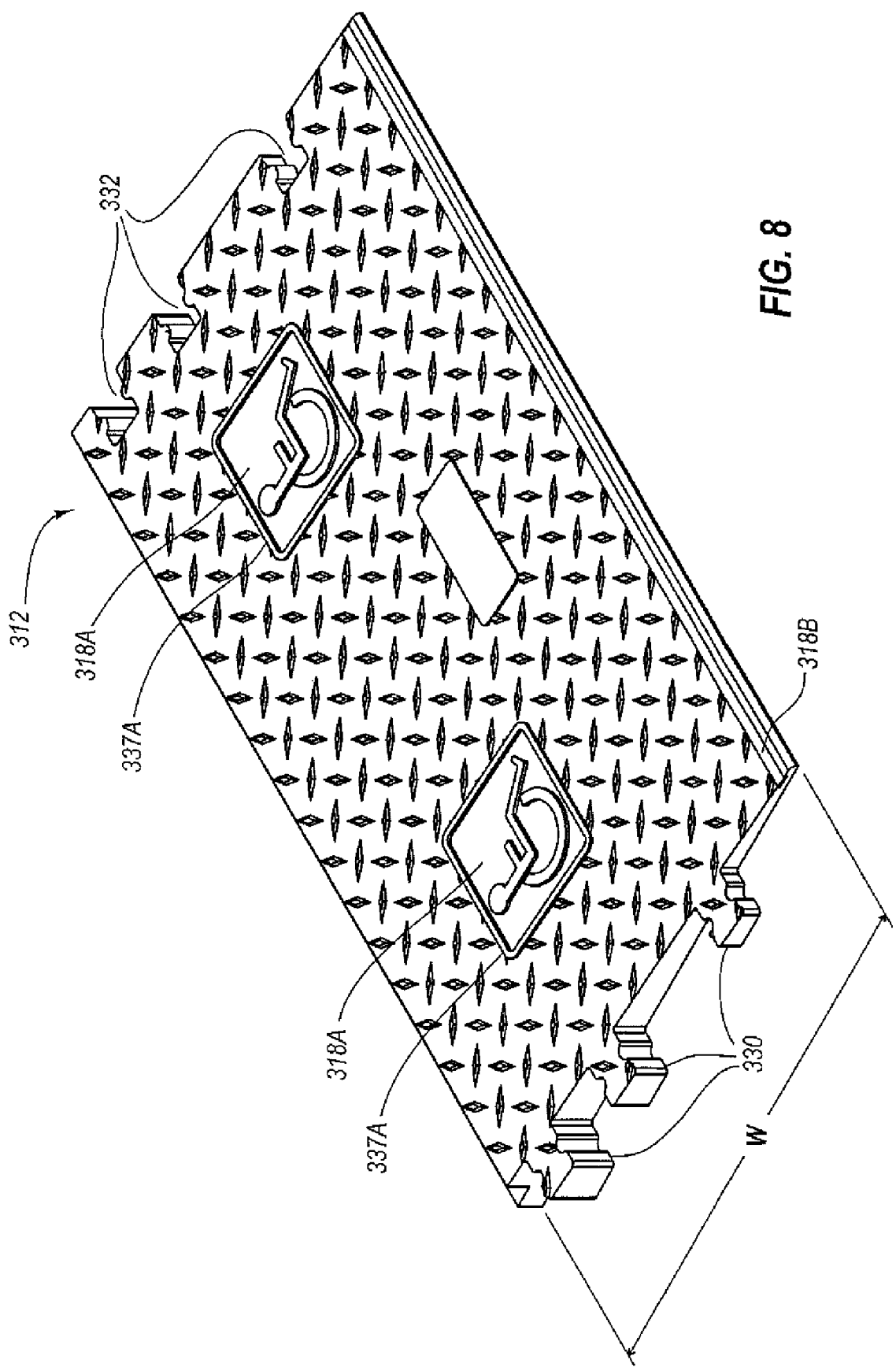
FIG. 8 is a perspective view of an exemplary side ramp member for use with a cable protection system according to an additional embodiment.
Figure 9:
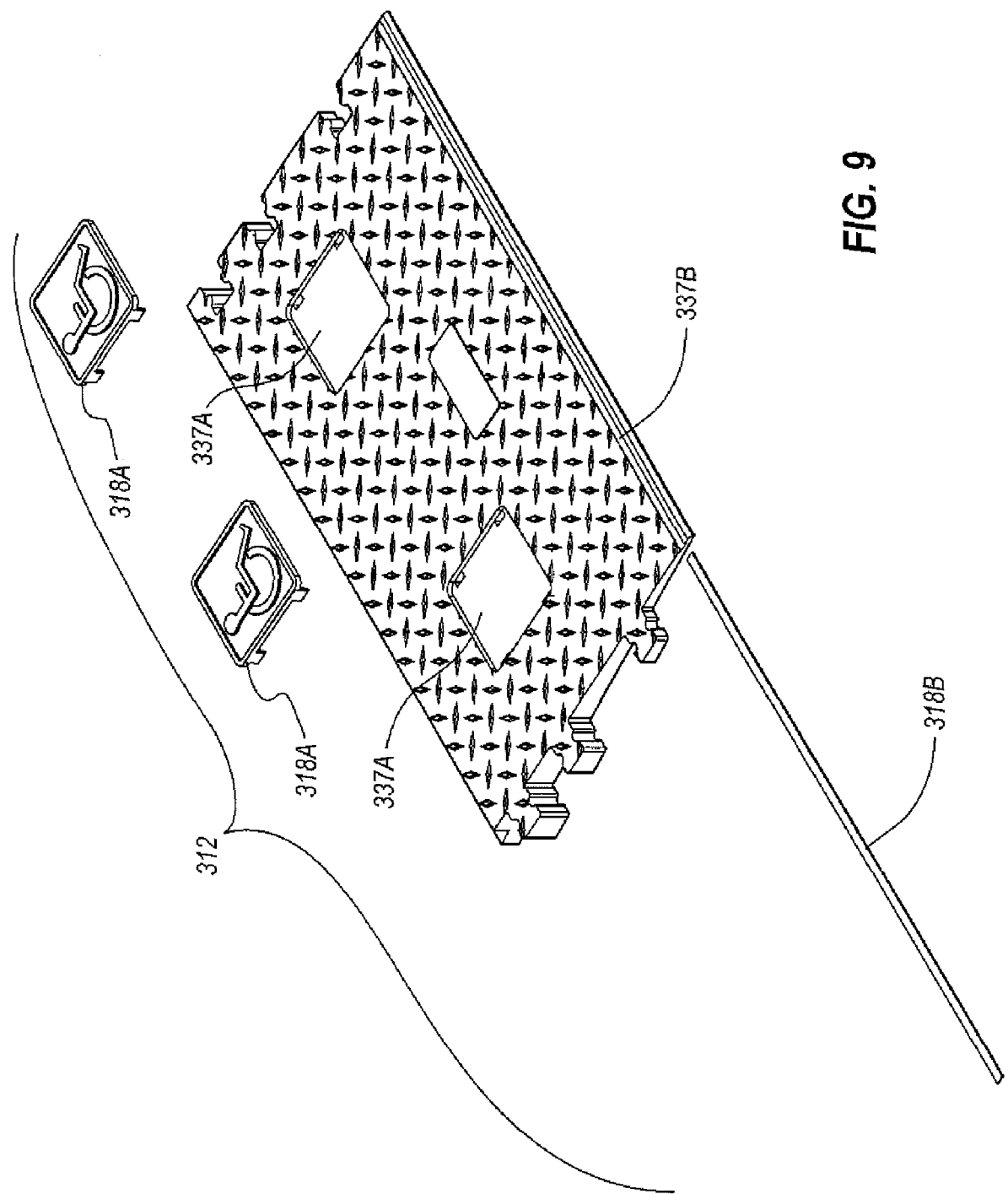
FIG. 9 is an exploded perspective view of the side ramp member shown in FIG. 8.

FIGS. 8-9 are perspective views of another exemplary side ramp 312 for use in a cable protection system. In at least one embodiment, the side ramp 312 is configured to removably attach to a base member of a cable protector. The side ramp 312 has a width W (see FIG. 8) that is greater than the width of some other side ramp embodiments, such as the first and second side ramps 112, 114 shown in FIGS. 1-5. In at least one embodiment, side ramp 312 may include one or more male end connectors 330 formed on one of its ends and one or more female end connectors 332 formed on its opposing end.

Side ramp 312 may also include a plurality of indicia 318A. The indicia 318A and other portions of the side ramp 312 may include photoluminescent material. The indicia 318A may be positioned at locations 337A on the side ramp 312. The locations 337A may represent, for example, recesses or enclosures defined in the side ramp 312.

Figure 10:
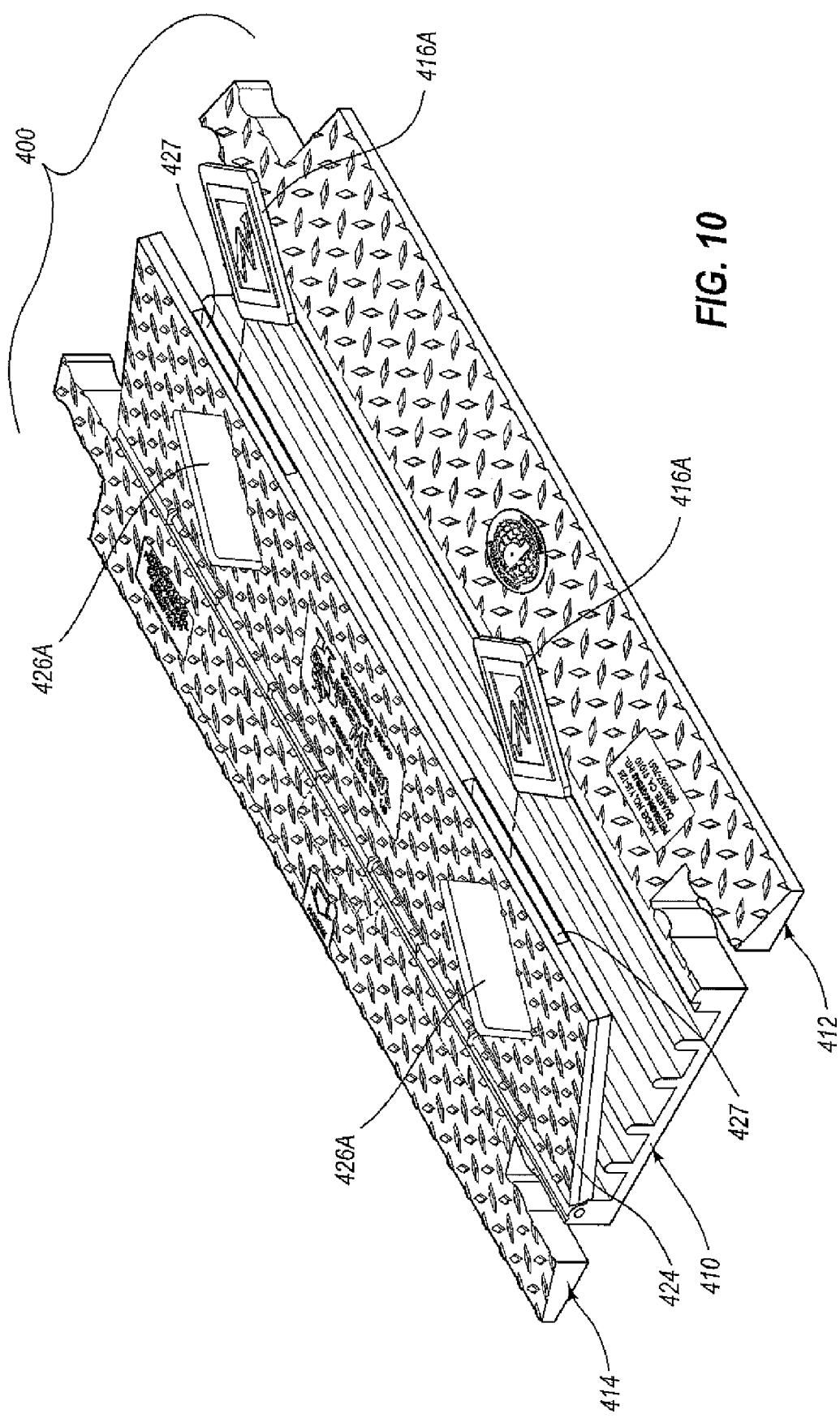
FIG. 10 is a perspective view of another exemplary cable protection system according to an additional embodiment.
Figure 11:
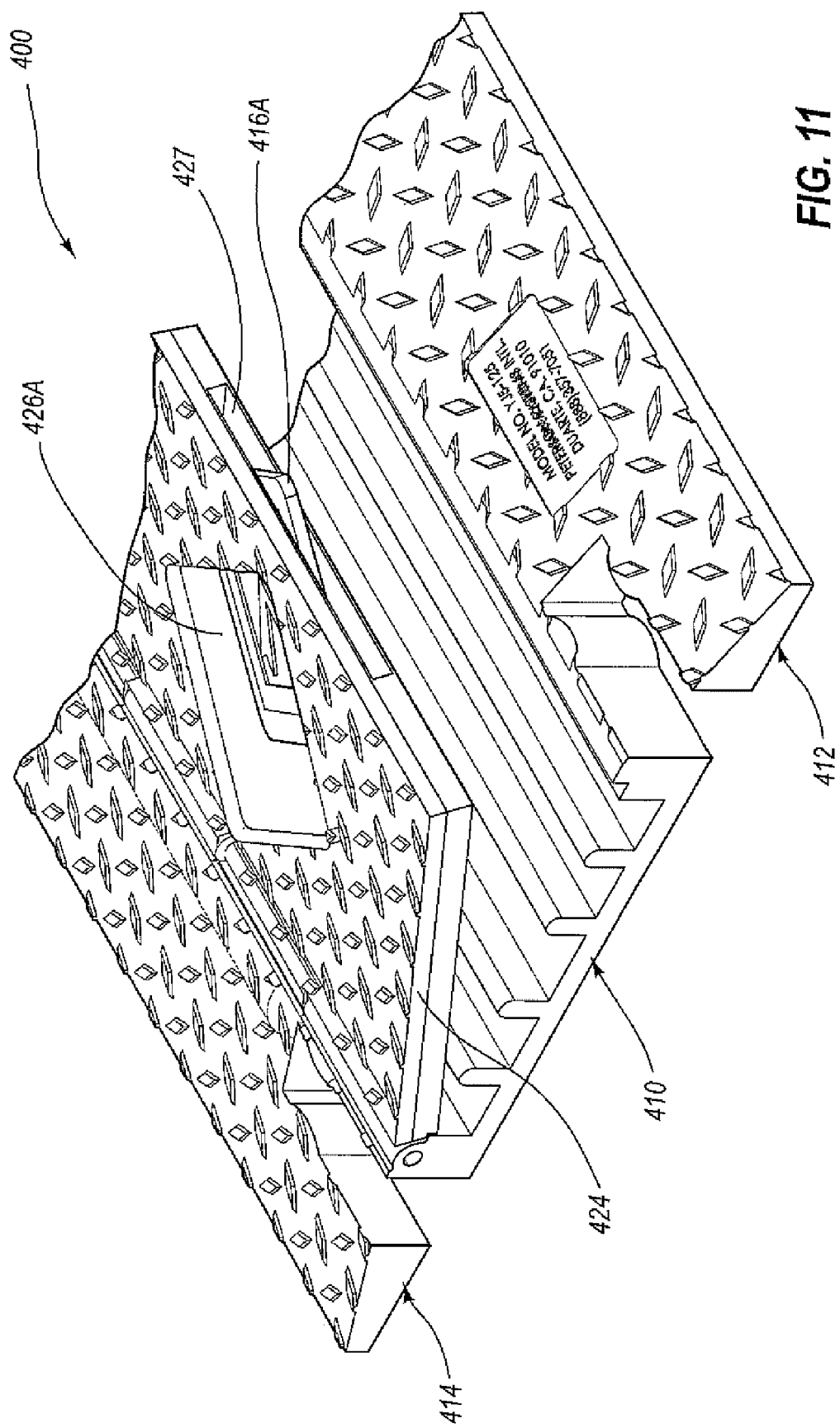
FIG. 11 is a close up view of the cable protection system shown in FIG. 10.

FIGS. 10-11 are perspective views of another exemplary cable protector 400 for use in a cable protection system. In at least one embodiment, the cable protector 410 is configured for assembly with first and second side ramps 412, 414. The cable protector 410 includes a cover structure 424. The cover structure 424 defines a pair of recess or slot features 426A that are sized to receive a pair of indicia members 416A. The indicia members 416A can be inserted into the recesses 424A through an opening 427 defined along a side surface of the cover structure 424. The recess 426A, opening 427, or indicia members 416A may include features that help retain the indicia members 416A within the recesses 426A.

In other embodiments, the cover structure 424 may include a substantial or at least partially transparent material so that the indicia members 416A, when positioned in the recesses 426A are visible while being enclosed within the cover structure 424. As with the various indicia members 116, 216, 316 described above, the indicia members 416A may include a photoluminescent material having photoluminescent properties.

The recesses 426A and openings 427, or similar structures, may be included in the first and second side ramps 412, 414 or at other locations on the cable protector 410 for insertion of an indicia member. Any portion of the cable protector and side ramps may include a substantial or at least partially transparent material, whether or not that transparent material is used in conjunction with an indicia member having photoluminescent properties. The opening into any given recess that receives an indicia member with photoluminescent properties may be positioned along side surfaces, along a top or bottom surface, or along an end surface of the cable protector and side ramps.

Although the various elements of the exemplary cable protection systems illustrated in FIGS. 1-11 have been described and illustrated with a certain degree of particularity, each element in these exemplary systems may be formed in any number of suitable shapes and sizes. For example, one or more of the elements described and illustrated in FIGS. 1-11 may be integrally formed with, as opposed to being removably attached to, one another. For example, one or more of the indicia described and/or illustrated herein may be integrally formed with, as opposed to being removably attachable to, one or more of the exemplary cable protectors or side ramps described and/or illustrated herein.

The exemplary cable protection systems and ramp structures illustrated in FIGS. 1-11 may also be adapted to house any number of cables and/or to extend over roadways and walkways of varying lengths. For example, any number of cable protectors in these exemplary systems may be removably attached together in a side-by-side fashion so as to house greater or lesser numbers of cables. Specifically, connectors formed on the side of a first cable protector may be removably inserted into apertures defined in the side of a second cable protector to removably attach the two cable protectors together in a side-by-side fashion. Additional cable protectors may be attached to either side of this assembly to increase the cable-housing capacity of the system as needed.

Similarly, any number of cable protectors may be removably attached together in an end-to-end fashion to extend the cable protection system across roadways or walkways of varying widths. For example, one or more cable protectors may be removably attached together in an end-to-end fashion by one or more ramps. Additionally or alternatively, cable protectors may be removably attached together in an end-to-end fashion using one or more end connectors provided on opposing ends of the cable protectors. As will be appreciated by those of skill in the art, mixing and matching the various "building blocks" of these exemplary cable protection systems in this manner enables a user to form a system capable of housing any number of cables and/or extending over roadways and walkways of varying lengths. The flexibility of the system as a whole is thus increased, resulting in greater ease of use and interchangeability of parts.

In addition, although the various cable protector embodiments illustrated herein have been described as having one or more connectors formed on a first side of the base member and one or more apertures formed on an opposing side of the base member, various alternative arrangements and configurations fall within the scope of the instant disclosure. For example, the base members may be formed with connectors on both sides, or may have apertures defined in each of its sides. Similarly, the base members may be formed such that a connector is formed on the same side as an aperture.

The elements of the exemplary cable protection systems described and/or illustrated herein may also be formed of any material or combination of materials. For example, the cable protectors and side ramps described and illustrated herein may be molded of a rigid, high-strength plastic material capable of withstanding repeated loadings and stresses. In addition, plastic plating or gripping may be formed on the upper surfaces of one or more of these elements, as illustrated in FIGS. 1-11, to improve traction for pedestrians or vehicles traveling over the cable protection system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A cable protector, comprising:
   a base member;
   at least one channel extending between opposing ends of the base member and configured to house at least one cable;
   at least one indicia member visible on the cable protector, the at least one indicia member including a photoluminescent portion.

2. The cable protector of claim 1, further comprising a cover structure pivotally attached to the base member, the indicia member being positioned on the cover structure.

3. The cable protector of claim 1, wherein the indicia member is included in a label and the label is secured to the base member.

4. The cable protector of claim 1, wherein the indicia member is embedded in the base member.

5. The cable protector of claim 1, wherein the indicia member is applied to the base member as a liquid and cured into a solid state while on the base member.

6. The cable protector of claim 1, further comprising at least one side ramp, wherein the indicia member is positioned on the side ramp.

7. The cable protector of claim 6, wherein the side ramp is removably attached to the base member.

8. The cable protector of claim 6, wherein the side ramp is integrally formed with the base member.

9. The cable protector of claim 1, further comprising first and second side ramps, wherein a separate indicia member is positioned on each of the first and second side ramps.

10. The cable protector of claim 1, wherein the base member comprises a recess defined in a top surface of the base member, wherein the indicia member is positioned in the recess.

11. The cable protector of claim 1, wherein the indicia member comprises a symbol selected from a group consisting of a power symbol, a tripping hazard symbol, a handicap symbol, and American National Standards Institute (ANSI) symbols.

12. The cable protector of claim 1, wherein the indicia member comprises at least one elongate strip of photoluminescent material, at least a portion of a sheet of photoluminescent material, a deposit of photoluminescent material, or a photoluminescent material additive.

13. A side ramp structured to be removably attachable to a side of a cable protector, the cable protector having a base member defining at least one channel extending between opposing ends of the base member and configured to house at least one cable, the side ramp comprising:
    a first side, a second side, a first end, and a second end;
    an indicia member visible on the side ramp, the indicia member including a photoluminescent portion.

14. The side ramp of claim 13, wherein the indicia member includes a symbol.

15. The side ramp of claim 13, wherein the indicia member includes a strip of photoluminescent material.

16. The side ramp of claim 13, wherein the indicia member is embedded in the side ramp.

17. The side ramp of claim 13, wherein the indicia member is applied to a surface of the side ramp in the form of a label or in the form of a liquid that cures into a solid on the surface.

18. A cable protection system, comprising:
    at least one cable protector;
    at least one channel extending between opposing ends of the cable protector and configured to receive at least one cable;
    at least one side ramp removably attached to the cable protector;
    at least one photoluminescent indicia member visible on or in at least one of the cable protector and the side ramp.

19. The cable protection system of claim 18, wherein the at least one photoluminescent indicia member is positioned on each of the at least one cable protector and the at least one side ramp.

20. The cable protection system of claim 18, wherein the at least one photoluminescent indicia member is embedded in the at least one of the cable protector and the side ramp.

21. The cable protection system of claim 18, wherein the cable protector comprises a cover structure pivotally attached to the cable protector, the photoluminescent indicia member being positioned on the cover structure.

22. The cable protection system of claim 18, wherein the photoluminescent indicia member comprises at least one of a symbol comprising photoluminescent material and a strip comprising photoluminescent material.

* * * * *